(12) United States Patent
Krishtal et al.

(10) Patent No.: US 10,855,701 B2
(45) Date of Patent: Dec. 1, 2020

(54) METHODS AND DEVICES FOR AUTOMATICALLY DETECTING ATTACK SIGNATURES AND GENERATING ATTACK SIGNATURE IDENTIFICATIONS

(71) Applicant: F5 Networks, Inc., Seattle, WA (US)

(72) Inventors: Vadim Krishtal, Tel Aviv (IL); Maor Moshe Gaon, Tel Aviv (IL); Peter Finkelshtein, Tel Aviv (IL)

(73) Assignee: F5 Networks, Inc., Seattle, WA (US)

( * ) Notice: Subject to any disclaimer, the term of this patent is extended or adjusted under 35 U.S.C. 154(b) by 0 days.

(21) Appl. No.: 16/181,042

(22) Filed: Nov. 5, 2018

(65) Prior Publication Data
US 2019/0141061 A1 May 9, 2019

Related U.S. Application Data

(60) Provisional application No. 62/581,621, filed on Nov. 3, 2017.

(51) Int. Cl.
*H04L 29/06* (2006.01)
(52) U.S. Cl.
CPC ...... *H04L 63/1416* (2013.01); *H04L 63/0236* (2013.01); *H04L 63/0263* (2013.01); *H04L 63/101* (2013.01); *H04L 63/1458* (2013.01)
(58) Field of Classification Search
CPC ............ H04L 63/1416; H04L 63/0236; H04L 63/0263; H04L 63/101; H04L 63/1458
See application file for complete search history.

(56) References Cited

U.S. PATENT DOCUMENTS

| | | | | |
|---|---|---|---|---|
| 8,510,834 | B2* | 8/2013 | Chesla | H04L 63/145 |
| | | | | 713/168 |
| 8,782,790 | B1* | 7/2014 | Smith | H04L 63/1416 |
| | | | | 726/24 |
| 9,407,646 | B2* | 8/2016 | Cruz Mota | H04L 63/1416 |
| 2007/0094728 | A1* | 4/2007 | Julisch | H04L 63/1491 |
| | | | | 726/23 |

* cited by examiner

*Primary Examiner* — Hee K Song
(74) *Attorney, Agent, or Firm* — Troutman Pepper Hamilton Sanders LLP (57) ABSTRACT

Network traffic management apparatuses, systems, methods, and computer-readable media for automatically detecting attack signatures and generating attack signature identifications, involving: collecting a stable dataset during a stable time; determining whether a cyber-attack is detected; when a cyber-attack is detected, periodically generating attack signatures and updating an enforcer with the attack signatures, the attack signatures representing dynamic rules to be enforced; validating the dynamic rules via a long-time validation mechanism, validating involving considering behavior of each dynamic rule after the cyber-attack and during a new cyber-attack and ranking each dynamic rule using the stable dataset, thereby generating persistent rules having a dynamic rule; exporting the persistent rules to a security enforcer; introducing the persistent rules to a persistent rule revocater; determining whether export of an unrevoked persistent rule is requested; and if requested, exporting the unrevoked persistent rule of the persistent rules through a mitigator and collecting statistics.

20 Claims, 6 Drawing Sheets

| 68a | 68b | 68c |
| --- | --- | --- |
| Metric name | Description | Bins |
| Request header size | Log2 scale for ranges 2^4...2^15, last bin>=2^15 | 12 |
| Number of URI parameters | Linear scale for number of URI parameters, last bin > 31 | 32 |
| Number of headers | Linear scale for number of headers, last bin > 63 headers | 64 |
| URI hash | hash of URI without parameters | 64 |
| Hosh hash | Hash of header value | 64 |
| URI length | Linear scale from 0 ... 512. last > 512 | 32 |
| ... | ... | ... |

FIG. 6

| 78a | 78b | 78c |
| --- | --- | --- |
| Request metadata bitmap | Time stamp | Counter |
| 000001000001000010000100000...000001000000001 | 89 | 213 |
| 000001001000000010000100000...000001000000001 | 554 | 795 |
| 000000000001000100100100000...000001000010000 | 554 | 60051 |
| ............... | ...... | |
| 010000000100000001000100000...000001000000001 | 554 | 3 |
| ... | ... | ... |

METHODS AND DEVICES FOR AUTOMATICALLY DETECTING ATTACK SIGNATURES AND GENERATING ATTACK SIGNATURE IDENTIFICATIONS

CROSS-REFERENCE TO RELATED APPLICATIONS

This document is a nonprovisional patent application, claiming the benefit of, and priority to, U.S. Provisional Patent Application Ser. No. 62/581,621, filed on Nov. 3, 2017, also entitled "METHODS AND DEVICES FOR AUTOMATICALLY DETECTING ATTACK SIGNATURES AND GENERATING ATTACK SIGNATURE IDENTIFICATIONS," which is hereby incorporated by reference in its entirety.

TECHNICAL FIELD

Generally, the present disclosure technically relates to program application security technologies. More particularly, the present disclosure technically relates to attack signature detection for program application security technologies. Even more particularly, the present disclosure technically relates to attack signature detection and denial of service (DoS) for program application security technologies.

BACKGROUND

In the related art, many organizations are under constant threat of a cyber-attack. However, few organizations fully understand such threat until the cyber-attack actually occurs. Such organizations must then invest in conducting deep post-attack forensic investigations to fully understand the manner in which the cyber-attack is launched, the manner in which the cyber-attack operates, and the available defense strategies therefor.

For such cyber-attacks, behavioral detection of attackers or "bad actors" is a time-consuming process. In addition, new attackers or "new" bad actors that join a cyber-attack are not immediately mitigated. As such, cyber-protection in the related art necessitates initially detecting new bad actors; however, related art techniques for so doing tend to adversely affect the health of the intended protected site.

Therefore, a need exists in the related art for cyber-protection techniques that are capable of identifying and using an attack signature for immediately blocking all new attackers which does not necessitate the use of Internet Protocol (IP) information or X-Forwarded-For (XFF) information.

SUMMARY

In addressing at least the challenges experienced in the related art, the subject matter of the present disclosure involves methods of automatically detecting attack signatures and generating attack signature identifications as well as devices therefor that are capable of using the attack signature identifications for immediately blocking all new attackers and that eliminate the necessity for Internet Protocol (IP) information or X-Forwarded-For (XFF) information, whereby the methods and devices of the present disclosure are implementable in network address translation (NAT) technology.

In accordance with an embodiment of the present disclosure, a method of automatically detecting attack signatures and generating attack signature identifications, implemented by network traffic apparatus having a processor and a memory having a non-transient memory device storing a set of executable instructions, the processor operable by the set of executable instructions comprising instructions for: collecting a "good" or stable dataset during a stable time, wherein collecting the stable dataset or "dataset" comprises requesting metadata collected during the stable time, wherein the stable time comprises a time period in which a site is not under attack, and wherein the time period excludes a predetermined time period before the cyber-attack; determining whether a cyber-attack is detected; when a cyber-attack is detected, periodically generating a set of attack signatures and updating an enforcer with the set of attack signatures, wherein the set of attack signatures comprises at least one of a selected features mask and a number of requests for metadata bitmaps, and wherein the set of attack signatures represents a set of dynamic rules to be enforced; validating the set of dynamic rules to be enforced via a long-time validation mechanism, wherein validating comprises considering behavior of each dynamic rule in the set of dynamic rules after the cyber-attack and during a new cyber-attack and ranking each dynamic rule by using the stable dataset, thereby generating a set of persistent rules comprising at least one dynamic rule of the set of dynamic rules having at least a predetermined rank; exporting the set of persistent rules to a security enforcer mechanism, wherein the security enforcement mechanism comprises a cloud; introducing the set of persistent rules to a persistent rule revocation mechanism; determining whether export of at least one unrevoked persistent rule is requested; and, if requested, exporting at least one unrevoked persistent rule of the set of persistent rules to a network intrusion detection system, and wherein the at least one unrevoked persistent rule is exported in a format compatible with at least one network intrusion detection system, and wherein the network intrusion detection system comprises at least one of a Snort system, a predicates language, an extended Wireshark syntax, and any other extension syntax comprising an F5 filtering feature.

In accordance with an embodiment of the present disclosure, a device for automatically detecting attack signatures and generating attack signature identifications comprises: a nontransient memory device storing a set of executable instructions for configuring a processor to: collect a "good" or stable dataset during a stable time, wherein the stable dataset comprises requesting metadata collected during the stable time, wherein the stable time comprises a time period in which a site is not under attack, and wherein the time period excludes a predetermined time period before the cyber-attack; determine whether a cyber-attack is detected; when a cyber-attack is detected, periodically generate a set of attack signatures and update an enforcer with the set of attack signatures, wherein the set of attack signatures comprises at least one of a selected features mask and a number of requests for metadata bitmaps, and wherein the set of attack signatures represents a set of dynamic rules to be enforced; validate the set of dynamic rules to be enforced via a long-time validation mechanism, wherein validation comprises consideration of behavior for each dynamic rule in the set of dynamic rules after the cyber-attack and during a new cyber-attack and rank of each dynamic rule using the stable dataset, whereby a set of persistent rules, comprising at least one dynamic rule of the set of dynamic rules having at least a predetermined rank, is generable; export the set of persistent miles to a security enforcer mechanism, wherein the security enforcement mechanism comprises a cloud; introduce the set of persistent rules to a persistent rule revocation mechanism; determine whether export of at least one unrevoked persistent rule is requested; and, if requested, export at least one unrevoked persistent rule of the set of persistent rules to a network intrusion detection system, and wherein the at least one unrevoked persistent rule is exported in a format compatible with at least one network intrusion detection system, and wherein the network intrusion detection system comprises at least one of a Snort system, a predicates language, an extended Wireshark syntax, and any other extension syntax comprising an F5 filtering feature.

In accordance with an embodiment of the present disclosure, a method of providing a device for automatically detecting attack signatures and generating attack signature identifications comprises: providing a nontransient memory device storing a set of executable instructions for configuring a processor to: collect a "good" or stable dataset during a stable time, wherein the stable dataset comprises requesting metadata collected during the stable time, wherein the stable time comprises a time period in which a site is not under attack, and wherein the time period excludes a predetermined time period before the cyber-attack; determine whether a cyber-attack is detected; when a cyber-attack is detected, periodically generate a set of attack signatures and update an enforcer with the set of attack signatures, wherein the set of attack signatures comprises at least one of a selected features mask and a number of requests for metadata bitmaps, and wherein the set of attack signatures represents a set of dynamic rules to be enforced; validate the set of dynamic rules to be enforced via a long-time validation mechanism, wherein validation comprises consideration of behavior for each dynamic rule in the set of dynamic rules after the cyber-attack and during a new cyber-attack and rank of each dynamic rule using the stable dataset—whereby a set of persistent rules, comprising at least one dynamic rule of the set of dynamic rules having at least a predetermined rank, is generable; export the set of persistent rules to a security enforcer mechanism, wherein the security enforcement mechanism comprises a cloud; introduce the set of persistent rules to a persistent rule revocation mechanism; determine whether export of at least one unrevoked persistent rule is requested; and, if requested, export at least one unrevoked persistent rule of the set of persistent rules to a network intrusion detection system, and wherein the at least one unrevoked persistent rule is exported in a format compatible with at least one network intrusion detection system, and wherein the network intrusion detection system comprises at least one of a Snort system, a predicates language, an extended Wireshark syntax, and any other extension syntax comprising an F5 filtering feature.

Some of the features in the present disclosure are broadly outlined in order that the section, entitled Detailed Description, is better understood and that the present contribution to the art by the present disclosure is better appreciated. Additional features of the present disclosure are described hereinafter. In this respect, understood is that the present disclosure is not limited in its implementation to the details of the components or steps as set forth herein or as illustrated in the several figures of the Drawing, but are capable of being carried out in various ways which are also encompassed by the present disclosure. Also, understood is that the phraseology and terminology employed herein are for illustrative purposes in the description and are not regarded as limiting.

BRIEF DESCRIPTION OF THE DRAWING

The above, and other, aspects, and features, of the several embodiments in the present disclosure will be more apparent from the following Detailed Description as presented in conjunction with the following several figures of the Drawing.

Corresponding reference numerals or characters indicate corresponding components throughout the several figures of the Drawing. Elements in the several figures are illustrated for simplicity and clarity and have not necessarily been drawn to scale. For example, the dimensions of some elements in the figures are emphasized relative to other elements for facilitating understanding of the various presently disclosed embodiments. Also, well-understood elements that are useful or necessary in commercially feasible embodiment are often not depicted to facilitate a less obstructed view of these various embodiments of the present disclosure.

DETAILED DESCRIPTION

Figure 1:
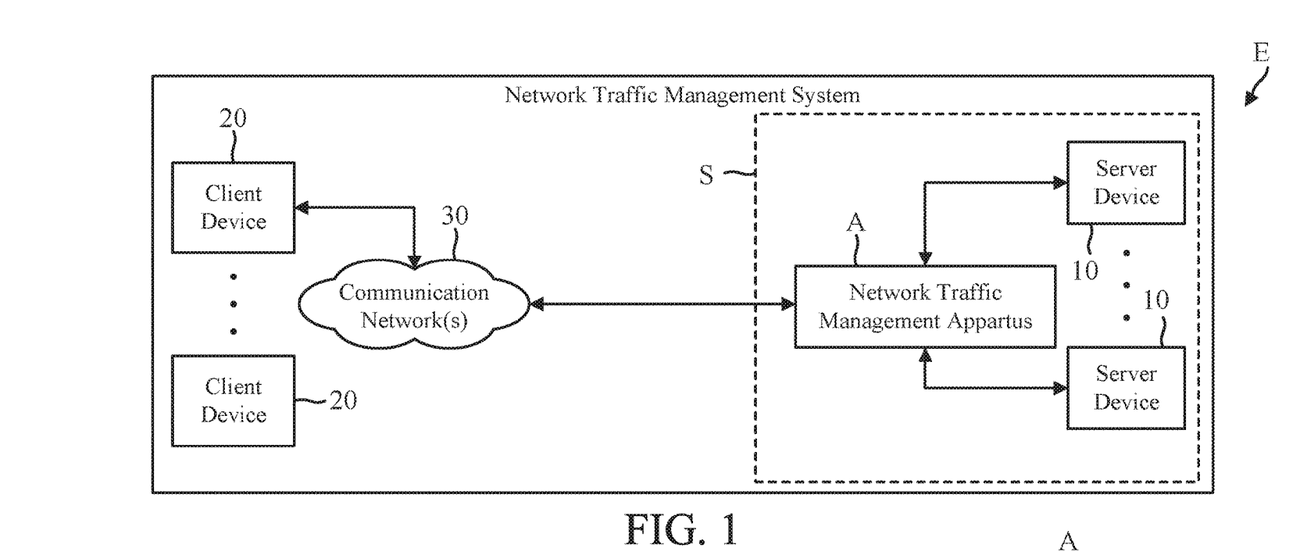
FIG. 1 is a schematic diagram illustrating an exemplary network environment which incorporates an exemplary network traffic management system having a network traffic management apparatus, in accordance with an embodiment of the present disclosure.

Referring to FIG. 1, this schematic diagram illustrates an exemplary network environment E which incorporates an exemplary network traffic management system S, the system S comprising a network traffic management apparatus A, in accordance with an embodiment of the present disclosure. The network traffic management apparatus A is coupled with a plurality of server devices 10 and a plurality of client devices 20 via at least one communication network 30. However, the network traffic management apparatus A, the server devices 10, and/or client devices 20 may be coupled together via other topologies as well. Additionally, the network traffic management system S may include other network devices, such as at least one router (not shown) and/or at least one switch (not shown), for example. The environment E provides many advantages, including, but not limited to, network traffic management methods, network traffic management systems, network traffic management apparatuses, and non-transitory computer readable media, that are capable of preventing a cyber-attack by automatically detecting attack signatures and generating attack signature identifications.

Figure 2:
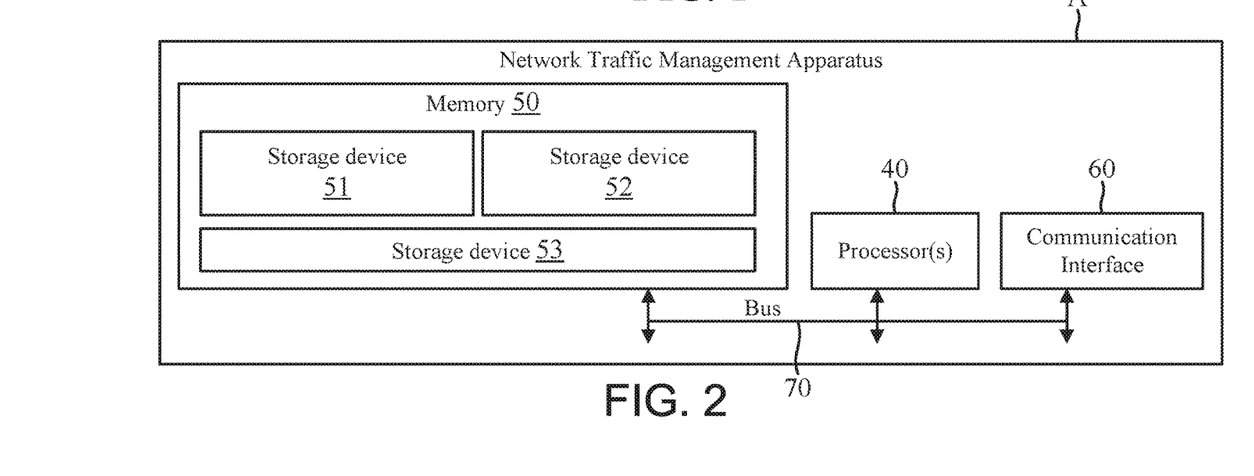
FIG. 2 is a schematic diagram illustrating an exemplary network traffic management apparatus of an exemplary network traffic management system, in accordance with an embodiment of the present disclosure.

Referring to FIG. 2, this schematic diagram illustrates an exemplary network traffic management apparatus A of an exemplary network traffic management system S, as shown in FIG. 1, in accordance with an embodiment of the present disclosure. The network traffic management apparatus A performs any number of functions, including automatically detecting attack signatures and generating attack signature identifications for preventing a cyber-attack. The network traffic management apparatus A comprises at least one processor 40, at least one memory 50, and/or a communication interface 60 which are coupled together by a bus 70 or other communication link. However, the network traffic management apparatus A can include other types and/or numbers of elements in other configurations.

Still referring to FIG. 2, the at least one processor 40 of the network traffic management apparatus A may execute programmed instructions, e.g., at least one set of executable instructions, that are stored in the at least one memory 50 of the network traffic management apparatus A for the any number of the above-identified functions. The at least one processor 40 of the network traffic management apparatus A may include at least one CPUs or at least one general purpose processor, each at least one general purpose processor having at least one processing core (not shown), for example, although other types of processors can also be used.

Still referring to FIG. 2, the at least one memory 50 of the network traffic management apparatus A stores the programmed instructions for at least one aspect of the technology, in accordance with the present disclosure. However, some, or all, of the programmed instructions could be stored elsewhere. A variety of different types of memory storage devices or memory devices 51, such as random-access memory (RAM), read-only memory (ROM), hard disk, solid state drives, flash memory, cloud storage, or any other computer-readable medium, from which information is read and to which information is written, e.g., by a magnetic, optical, or other reading and writing system that is coupled to the at least one processor 40, can be used for the memory 50.

Still referring to FIG. 2, the memory 50 of the network traffic management apparatus A can store at least one application program or "application(s)" comprising a set of executable instructions, e.g., a set of computer-executable instructions that, when executed by the network traffic management apparatus A, cause the network traffic management apparatus A to perform actions, such as transmitting, receiving, or otherwise processing messages, for example, and to perform other actions described herein and shown in FIGS. 3-6. The application(s) can be implemented as modules or components of other application(s). Further, the application(s) can be implemented as operating system extensions, module, plugins, and/or the like.

Still referring to FIG. 2, even further, the application(s) may be operative in a cloud-based computing environment. The application(s) can be executed within or as virtual machine(s) or virtual server(s) that may be managed in a cloud-based computing environment. Also, the application (s), and even the network traffic management apparatus A itself, may be located in virtual server(s) running in a cloud-based computing environment, rather than being tied to one or more specific physical network computing devices. Also, the application(s) may be running in one or more virtual machines (VMs), executing on the network traffic management apparatus A. Additionally, in one or more embodiments of this technology, virtual machine(s) running on the network traffic management apparatus A may be managed or supervised by a hypervisor.

Still referring to FIG. 2, in this particular example, the memory 50 of the network traffic management apparatus A comprises at least one memory storage device, e.g., memory storage devices 51, 52, 53, for automatically detecting attack signatures and generating attack signature identifications, although the memory 50 can include other policies, modules, databases, or applications, for example. For instance, a memory storage device 51, for automatically detecting attack signatures and generating attack signature identifications, comprises: a nontransient memory device storing a set of executable instructions for configuring a processor 40 to: collect a "good" or stable dataset during a stable time, wherein the stable dataset comprises requesting metadata collected during the stable time, wherein the stable time comprises a time period in which a site is not under attack, and wherein the time period excludes a predetermined time period before the cyber-attack; determine whether a cyber-attack is detected; when a cyber-attack is detected, periodically generate a set of attack signatures and update an enforcer with the set of attack signatures, wherein the set of attack signatures comprises at least one of a selected features mask and a number of requests for metadata bitmaps, and wherein the set of attack signatures represents a set of dynamic rules to be enforced; validate the set of dynamic rules to be enforced via a long-time validation mechanism, wherein validation comprises consideration of behavior for each dynamic rule in the set of dynamic rules after the cyber-attack and during a new cyber-attack and rank of each dynamic rule using the stable dataset, whereby a set of persistent rules, comprising at least one dynamic rule of the set of dynamic rules having at least a predetermined rank, is generable; export the set of persistent rules to a security enforcer mechanism, wherein the security enforcement mechanism comprises a cloud; introduce the set of persistent rules to a persistent rule revocation mechanism; determine whether export of at least one unrevoked persistent rule is requested; and, if requested, export at least one unrevoked persistent rule of the set of persistent rules to a network intrusion detection system, and wherein the at least one unrevoked persistent rule is exported in a format compatible with at least one network intrusion detection system, and wherein the network intrusion detection system comprises at least one of a Snort system, a predicates language, an extended Wireshark syntax, and any other extension syntax comprising an F5 filtering feature.

Still referring to FIG. 2 and referring back to FIG. 1, he communication interface 60 of the network traffic management apparatus A operatively couples and communicates between the network traffic management apparatus A, the server devices 10, and/or the client devices 20, which are all coupled together by the communication network(s) 30, although other types and/or numbers of communication networks or systems with other types and/or numbers of connections and/or configurations to other devices and/or elements can also be used. By example only, the communication network(s) 30 can include local area network(s) (LAN(s)) or wide area network(s) (WAN(s)); and the communication network(s) 30 can use Transmission Control Protocol/Internet Protocol (TCP/IP) over Ethernet and industry-standard protocols, although other types and/or numbers of protocols and/or communication networks can be used. The communication network(s) 30, in this example, can employ any suitable interface mechanisms and network communication technologies including, for example, teletraffic in any suitable form, e.g., voice, modem, and the like, Public Switched Telephone Network (PSTNs), Ethernet-based Packet Data Networks (PDNs), combinations thereof, and the like. The communication network(s) 30 can also include direct connection(s), e.g., for when a device, such as the network traffic management apparatus A, one or more of the client devices 20, or one or more of the server devices 10 operate as virtual instances on the same physical machine).

Still referring to FIG. 2, while the network traffic management apparatus A is illustrated in this example as comprising a single device, the network traffic management apparatus A in other examples can include a plurality of devices or blades each having one or more processors 40 (each processor 40 having one or more processing cores) that implement one or more steps of the herein described technology. In these examples, one or more of the devices can have a dedicated communication interface or a dedicated memory. Alternatively, one or more of the devices can utilize the memory 50, communication interface 60, or other hardware or software components of one or more other devices included in the network traffic management apparatus A. Additionally, one or more of the devices that together comprise the network traffic management apparatus A in other examples can be standalone devices or integrated with one or more other devices or apparatuses, such as one of the server devices, for example. Moreover, one or more of the devices of the network traffic management apparatus A in these examples can be in a same or a different communication network including one or more public, private, or cloud networks, for example.

Still referring to FIG. 2 and referring back to FIG. 1, each of the server devices 10 of the network traffic management system S in this example includes one or more processors (not shown), a memory (not shown), and a communication interface (not shown), which are coupled together by a bus or other communication link, although other numbers and/or types of network devices could be used. The server devices 10, in this example, process requests received from the client devices 20 via the communication network(s) according to the hypertext transfer Protocol (HTTP) based application Request for Comments (RFC) Protocol, for example. Various applications may be operating on the server devices 10 and transmitting data, e.g., files or Web pages, to the client devices 20 via the network traffic management apparatus A in response to requests from the client devices 20. The server devices 10 may be hardware or software or may represent a system with multiple servers 10 in a pool, which may include internal or external networks.

Still referring to FIG. 2 and referring back to FIG. 1, although the server devices 10 are illustrated as single devices, one or more actions of each of the server devices 10 may be distributed across one or more distinct network computing devices that together comprise one or more of the server devices 10. Moreover, the server devices 10 are not limited to a particular configuration. Thus, the server devices 10 may contain a plurality of network computing devices that operate using a master/slave approach, whereby one of the network computing devices of the server devices 10 operates to manage and/or otherwise coordinate operations of the other network computing devices. The server devices 10 may operate as a plurality of network computing devices within a cluster architecture, a peer-to peer architecture, virtual machines, or within a cloud architecture, for example.

Still referring to FIG. 2 and referring back to FIG. 1, thus, the technology disclosed herein is not to be construed as being limited to a single environment and other configurations and architectures are also envisaged. For example, one or more of the server devices 10 can operate within the network traffic management apparatus A, itself, rather than as a stand-alone server device communicating with the network traffic management apparatus A via the communication network(s) 30. In this example, the one or more server devices 10 operate within the memory 50 of the network traffic management apparatus A.

Still referring to FIG. 2 and referring back to FIG. 1, the client devices 20 of the network traffic management system S, in this example, include any type of computing device that can interface with a communication network 30, such as mobile computing devices, desktop computing devices, laptop computing devices, tablet computing devices, notebook computing devices, virtual machines, including cloud-based computers, or the like. Each of the client devices 20 in this example includes a processor (not shown), a memory (not shown), and a communication interface (not shown), which are coupled together by a bus (not shown) or other communication link, although other numbers and/or types of network devices could be used.

Still referring to FIG. 2 and referring back to FIG. 1, the client devices 20 may run interface applications, such as standard Web browsers or standalone client applications, which may provide an interface to make requests for, and receive content stored on, one or more of the server devices 10 via the communication network(s). The client devices 20 may further include a display device (not shown), such as a display screen or touchscreen, and/or an input device, such as a keyboard for example. Although the exemplary network traffic management system S, with the network traffic management apparatus A, server devices 10, client devices 20, and communication network(s) 30 are described and illustrated in the Drawing, other types and/or numbers of systems, devices, components, and/or elements in other topologies can be used. Understood is that the systems herein described are for exemplary purposes, as many variations of the specific hardware and software used to implement the examples are possible.

Still referring to FIG, 2 and referring back to FIG. 1, at least one component depicted in the network traffic management system S, such as the network traffic management apparatus A, client devices 20, or server devices 10, for example, is configurable to operate as virtual instances on the same physical machine. In other words, at least one of the network traffic management apparatus A, client devices 20, or server devices 10 is operable on the same physical device, rather than as separate devices communicating through communication network(s). Additionally, the system S may comprise more or fewer network traffic management apparatus A, client devices 20, or server devices 10 than illustrated in FIG. 1. The client devices 20 could also be implemented as applications on the network traffic management apparatus A itself as a further example.

Still referring to FIG. 2 and referring back to FIG. 1, in addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples.

The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof. The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 3:
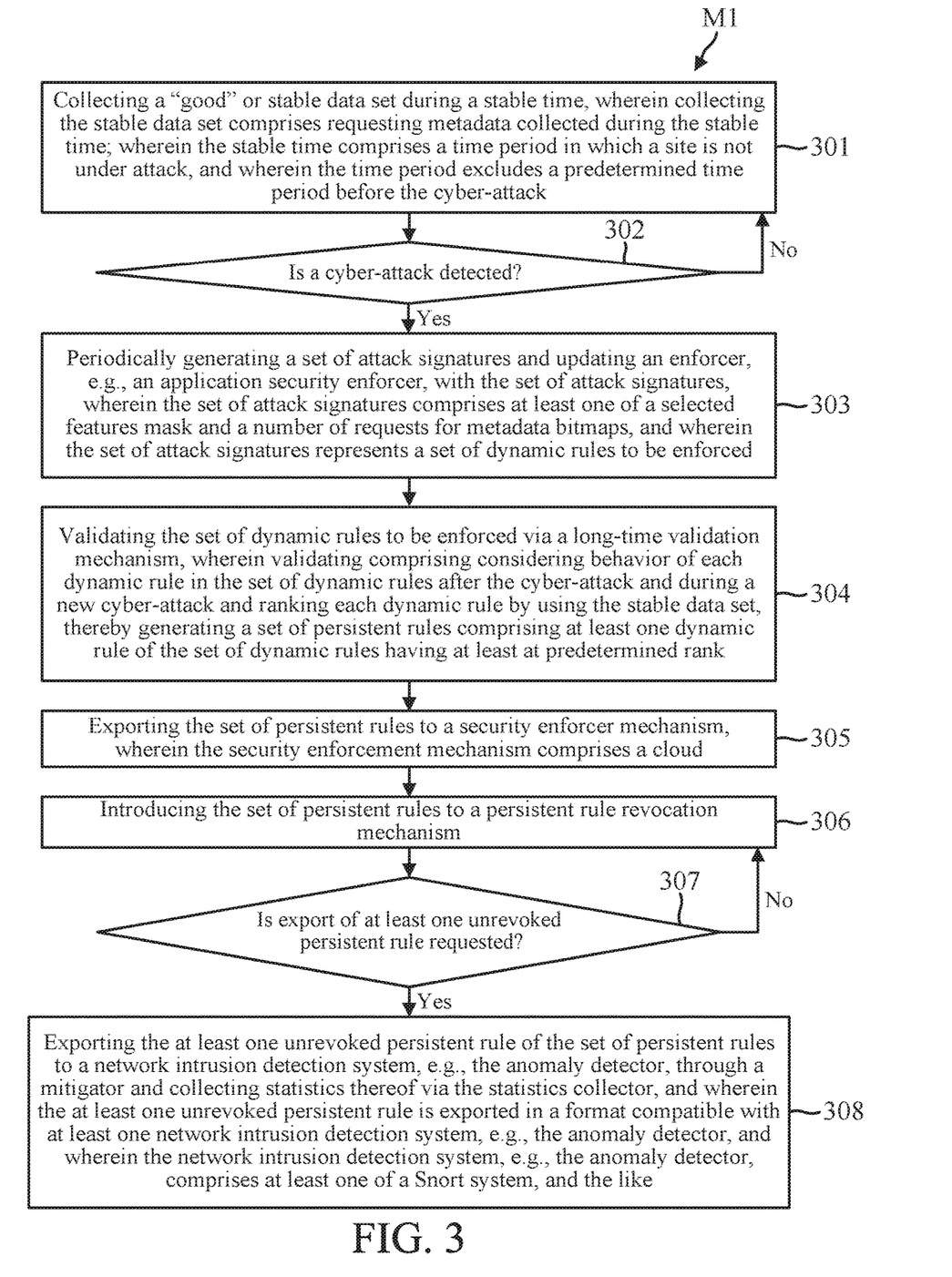
FIG. 3 is a flow diagram illustrating a method of automatically detecting attack signatures and generating attack signature identifications, in accordance with an embodiment of the present disclosure.
Figure 5:
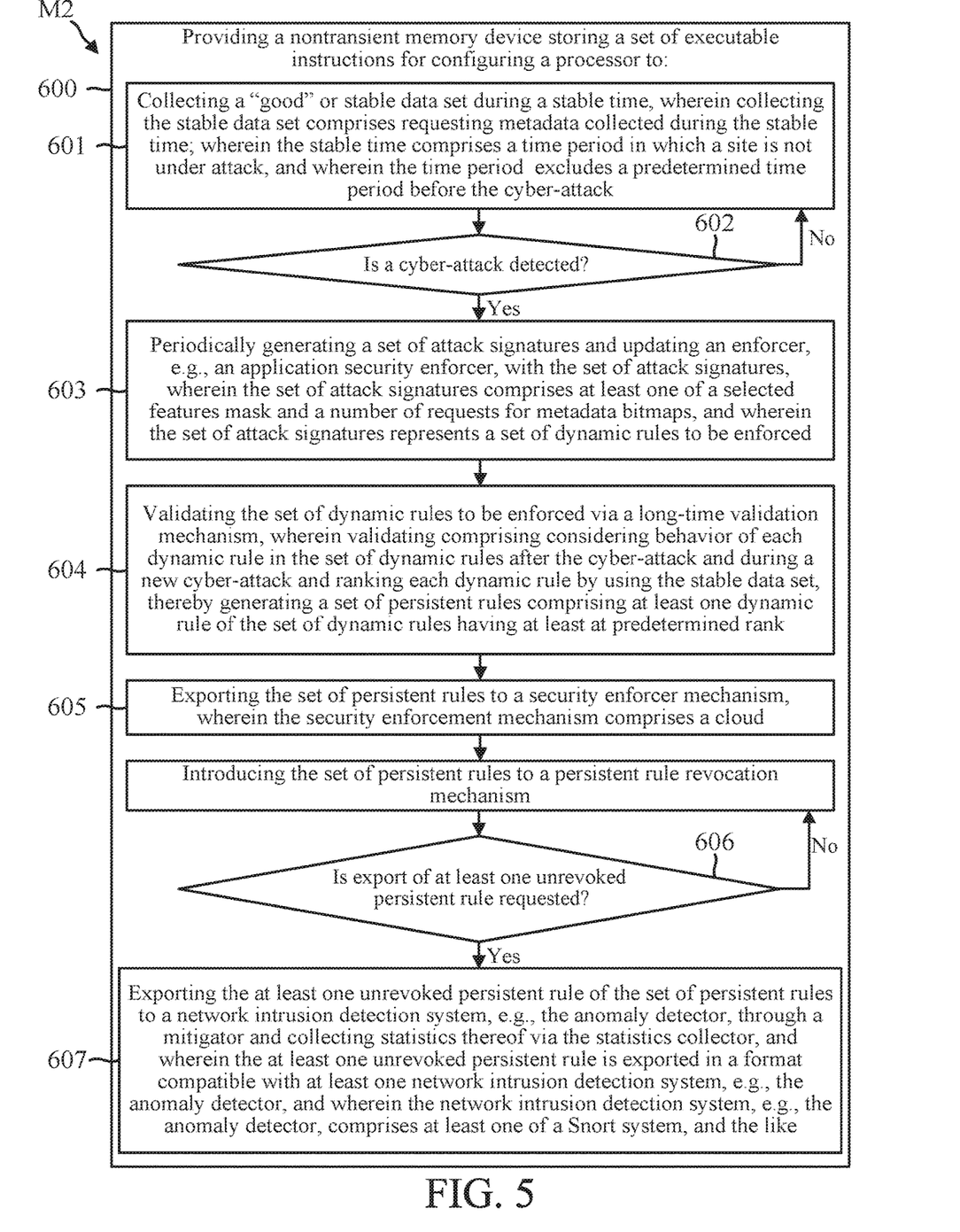
FIG. 5 is a flow diagram illustrating a method of providing a device for automatically detecting attack signatures and generating attack signature identifications, in accordance with an embodiment of the present disclosure.

Referring to FIG. 3 and referring ahead to FIG. 5, this flow diagram illustrates a method M1 of automatically detecting attack signatures and generating attack signature identifications associated with a cyber-attack by way of a network traffic management apparatus A having a processor 40 and a memory 50, in accordance with an embodiment of the present disclosure. The method M1 of automatically detecting attack signatures and generating attack signature identifications, implemented by network traffic apparatus A having a processor 40 and a memory 50 having a non-transient memory device 51 storing a set of executable instructions, the processor 40 operable by the set of executable instructions for: collecting a "good" or stable dataset 54 during a stable time, e.g., via a statistics collector 55, wherein collecting the stable dataset 54 comprises requesting metadata collected during the stable time, wherein the stable time comprises a time period in which a site is not under attack, and wherein the time period excludes a predetermined time period before the cyber-attack, as indicated by block 301; determining whether a cyber-attack is detected, as indicated by block 302; when a cyber-attack is detected, e.g., via an anomaly detector 60 identifying a set of bad IPs 64, periodically generating a set of attack signatures (not shown), e.g., via a signatures generator 56, and updating an enforcer, e.g., an application security enforcer 57, with the set of attack signatures, wherein the set of attack signatures comprises at least one of a selected features mask and a number of requests for metadata bitmaps, and wherein the set of attack signatures represents a set of dynamic rules 61 to be enforced, as indicated by block 303; validating the set of dynamic rules 61 to be enforced via a long-time validation mechanism 58, wherein validating comprises considering behavior of each dynamic rule 61 in the set of dynamic rules 61 after the cyber-attack and during a new cyber-attack and ranking each dynamic rule 61 by using the stable dataset 54, thereby generating a set of persistent rules 59 comprising at least one dynamic rule 61 of the set of dynamic rules 61 having at least a predetermined rank, as indicated by block 304; exporting the set of persistent rules 59 to a security enforcer mechanism, e.g., the application security enforcer 57, wherein the security enforcement mechanism, e.g., the application security enforcer 57, comprises a cloud (not shown), as indicated by block 305; introducing the set of persistent rules 59 to a persistent rule revocation mechanism, e.g., a BADoS grey list mechanism 62, as indicated by block 306; determining whether export of at least one unrevoked persistent rule 59u is requested, as indicated by block 307; and, if requested, exporting the at least one unrevoked persistent rule 59u of the set of persistent rules 59 to a network intrusion detection system, e.g., the anomaly detector 60, through a mitigator 63 and collecting statistics thereof via the statistics collector 55, and wherein the at least one unrevoked persistent rule 59u is exported in a format compatible with at least one network intrusion detection system, e.g., the anomaly detector 60, and wherein the network intrusion detection system, e.g., the anomaly detector 60, comprises at least one of a Snort system, a predicates language, an extended Wireshark syntax, and any other extension syntax comprising an F5 filtering feature, as indicated by block 308.

Figure 4:
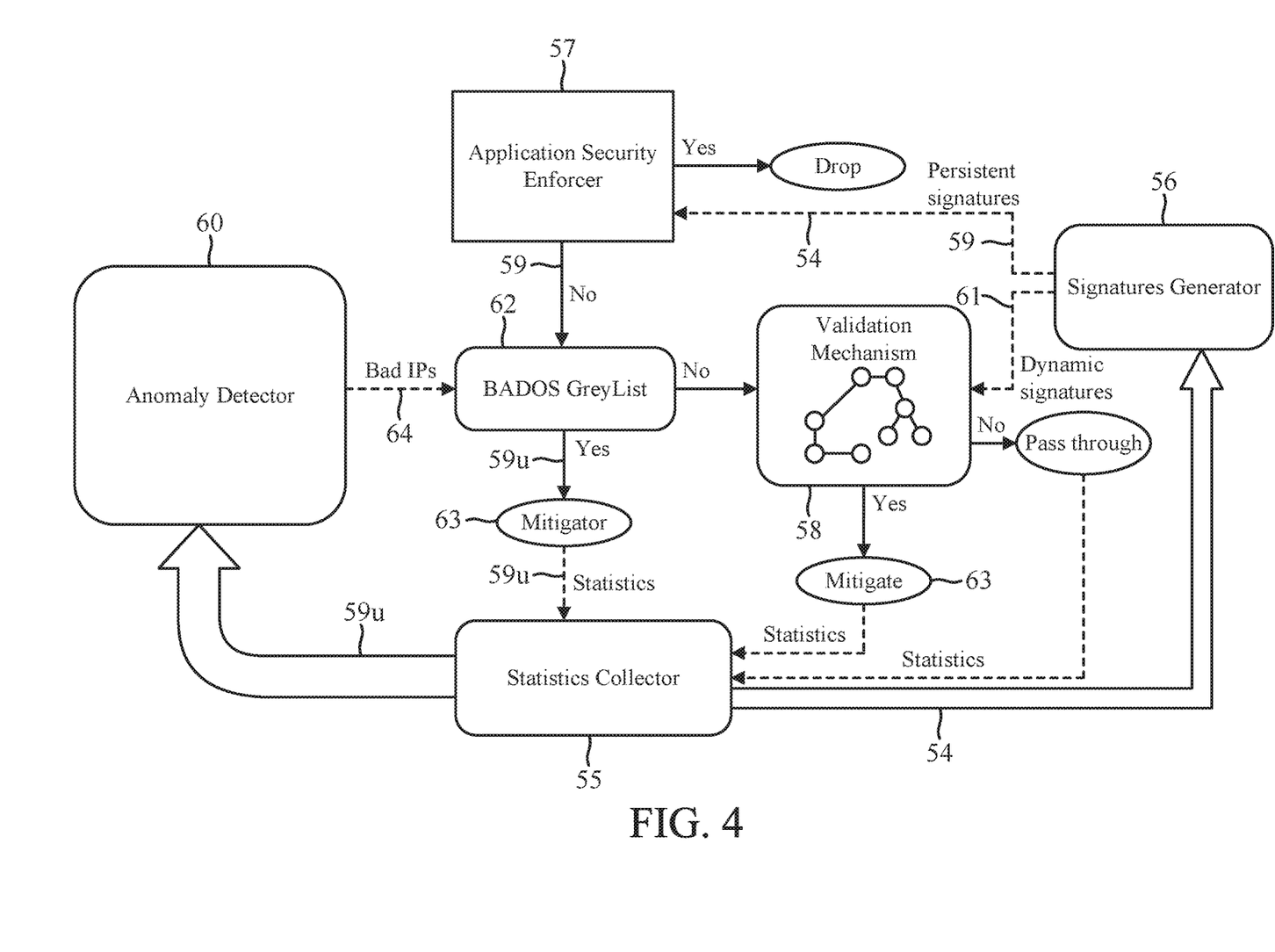
FIG. 4 is a workflow diagram illustrating operation of a processor operable by a set of executable instructions storable in relation to a non-transient memory device for automatically detecting attack signatures and generating attack signature identifications, in accordance with an embodiment of the present disclosure.

Referring to FIG. 4, this workflow diagram illustrates operation of a processor 40 operable by a set of executable instructions storable in relation to a non-transient memory device 51 for automatically detecting attack signatures and generating attack signature identifications, in accordance with an embodiment of the present disclosure. The processor 40 operates by the set of executable instructions for: collecting a "good" or stable dataset 54 during a stable time, e.g., via a statistics collector 55, wherein collecting the stable dataset 54 comprises requesting metadata collected during the stable time, wherein the stable time comprises a time period in which a site is not under attack, and wherein the time period excludes a predetermined time period before the cyber-attack, as indicated by block 301; determining whether a cyber-attack is detected, as indicated by block 302; when a cyber-attack is detected, e.g., via an anomaly detector 60 identifying a set of bad IPs 64, periodically generating a set of attack signatures (not shown), e.g., via a signatures generator 56, and updating an enforcer, e.g., an application security enforcer 57, with the set of attack signatures, wherein the set of attack signatures comprises at least one of a selected features mask and a number of requests for metadata bitmaps, and wherein the set of attack signatures represents a set of dynamic rules 61 to be enforced, as indicated by block 303; validating the set of dynamic rules 61 to be enforced via a long-time validation mechanism 58, wherein validating comprises considering behavior of each dynamic rule 61 in the set of dynamic rules 61 after the cyber-attack and during a new cyber-attack and ranking each dynamic rule 61 by using the stable dataset 54, thereby generating a set of persistent rules 59 comprising at least one dynamic rule 61 of the set of dynamic rules 61 having at least a predetermined rank, as indicated by block 304; exporting the set of persistent rules 59 to a security enforcer mechanism, e.g., the application security enforcer 57, wherein the security enforcement mechanism, e.g., the application security enforcer 57, comprises a cloud (not shown), as indicated by block 305; introducing the set of persistent rules 59 to a persistent rule revocation mechanism, e.g., a BADoS grey list mechanism 62, as indicated by block 306; determining whether export of at least one unrevoked persistent rule 59u is requested, as indicated by block 307; and, if requested, exporting the at least one unrevoked persistent rule 59u of the set of persistent rules 59 to a network intrusion detection system, e.g., the anomaly detector 60, through a mitigator 63 and collecting statistics thereof via the statistics collector 55, and wherein the at least one unrevoked persistent rule 59u is exported in a format compatible with at least one network intrusion detection system, e.g., the anomaly detector 60, and wherein the network intrusion detection system, e.g., the anomaly detector 60, comprises at least one of a Snort system, a predicates language, an extended Wireshark syntax, and any other extension syntax comprising an F5 filtering feature, as indicated by block 308.

Still referring to FIG. 4 and referring back to FIG. 3, the anomaly detector 60 requires a long period of time to perform detection in order to capture data corresponding to the behavior of bad actors, typically approximately every 5 minutes. During a "good" or stable time period, collecting the stable dataset 54 comprises collecting data in response to a digital request as to normal behavior. When a cyber-attack commences, a combination of both good and bad digital requests is made. Rules are created that describe attack patterns by bad actors, wherein attack patterns are analyzed to determine whether they adversely affect good traffic, and wherein false positive readings are eliminable. If an actor has not yet been determined as to being "good" or "bad," a new signature is generated and validated, e.g., in the step of validating the set of dynamic rules M to be enforced via a long-time validation mechanism 58.

Still referring to FIG. 4 and referring back to FIG. 3, the method M1 may also be implemented to prevent conflicts of good traffic by using machine-learning, e.g., comprising a self-learning algorithm, to distinguish between good actors and bad actors, whereby traffic efficiency is improved, and whereby good traffic conflict is minimized. For distinguishing between good actors and bad actors, the self-learning algorithm may use at least one technique of (a) using a threshold parameter, whereby the self-learning algorithm is self-updateable by classifying data relating to good actors and bad actors, and whereby rules are implementable in response to updating the self-learning algorithm; and (b) avoiding a popular request of "get/", a keypoint "—active action—", requests that have an absent header, such as a host header, e.g., headers are typically absent in requests from a "bot" as a "bot" is incapable of copying all the parameters relating to a good actor, wherein an absence of expected information creates a flag indicating a bad actor, and wherein an attack signature is creatable to identify the bad actor. The self-learning algorithm comprises applying: a support vector machine SVM), linear regression, deep learning, and cluster analysis, in accordance with embodiments of the present disclosure.

Still referring to FIG. 4 and referring back to FIG. 3, for distinguishing between good actors and bad actors, the method M1 may also implement a BIP-IP system S3 (FIG. 8) for performing a "reverse-proxy" step at the front of a site. The a BADoS grey list mechanism 62 performs a step of grey-listing in relation to the unrevoked persistent signatures 59u, whereby cyber-protection is provided. In related art cyber-protection systems uses only baseline bad traffic to develop a footprint. However, in the embodiments of the present disclosure, the method M1 uses an "unclean" dataset comprising data relating to both good traffic and bad traffic for developing a footprint, e.g., of the attack signatures. Further, the method M1 uses unsupervised machine learning-or-organizing-and-exploring-data (LODE) techniques as well as binning techniques for determining an acceptable numerical value for a number of requests by an actor, wherein a number of requests by an actor that exceeds such threshold would be identified as an "abnormal" or "suspicious" actor. Typically, good actors make a steadily sparse stream of requests, whereas bad actors typically make frequent large groups of requests. For example, the method M1 may flag a bad actor if the requests received are made more frequently than every 10 seconds, by example only, Still referring to FIG. 4 and referring back to FIG. 3, in the method M1, the steps of detecting attack signatures and generating attack signature identifications are performable in parallel with steps for determining "bad actors." Once the method M1 is enabled and commences performing the steps of detecting attack signatures and generating attack signature identifications via enabling an "Attack signatures" feature, the step of collecting a "good" or stable dataset 54 during a stable time, e.g., statistics, and the step of periodically generating a set of attack signatures, e.g., via a signatures generator 56, during the attack are performed. If mitigation is enabled, e.g., via the mitigator 63 (not specified as "NONE") and the "Operation" mode is set to "Blocking," requests that match the attack signature will be blocked with the connection being reset (during the attack).

Still referring to FIG. 4 and referring back to FIG. 3, in the method M1, the use of machine learning involves lowering the resolution to vectors with only the bins having the most anomaly, wherein the attackers fall to a small set of "Rule Bit" vectors with the highest occurrences count, in a "Bad Samples" requests. High-impact attackers should have some of the high-impact features of the attack. The Bad Samples are analysed to produce a list a of "prominent" bins with high anomaly. These prominent bins describe the attack traffic, as a whole. Different groups of similar attackers may have only a subset of prominent bins. The method M1 involves finding combinations of these bins that correspond to high-impact attacker groups. The combinations of the prominent bins will be described by the Rule Bit Vectors. An attack signature comprises all selected combinations of the prominent bins as described by the Rules Bit Vectors.

Still referring to FIG. 4 and referring back to FIG. 3, in the method M1, the collecting step comprises collecting a "good" dataset (requesting metadata that were collected during the stable time, such as when not under attack, e.g., "far enough from attack start," wherein "far enough from attack start" denotes a time period wherein the traffic has been stable, and wherein behavioral anomalies are absent. The behavior assumed as stable when a metric value was not significantly changed [10 min-1 hour] (depending on the metric behavior—sharp behavior change requires longer stabilization time) and during this stabilization period attack was not detected. When an anomaly is detected, the collecting step comprises collecting a "bad" dataset comprising a mixture of good requests and bad requests, wherein the number of bad requests is greater than the number of good requests. Based on an anomaly of certain metrics/bins, the generating step comprises creating a set of rules that covers an "as high as possible" "bad" dataset and an "as low as possible" "bad" dataset. This set of rules represents a current signature that should be enforced internally by a BADoS grey list mechanism 62.

Still referring to FIG. 4 and referring back to FIG. 3, in the method M1, after each attack, the self-learning algorithm receives a "chunk" or a set of bad samples and a set of pre-stored good samples. The self-learning algorithm comprises an algorithm mediator process, residing in a program that running as a background process, rather than being under the direct control of an interactive user, e.g., a Berkeley automounter or an "amd" daemon, that handles the aggregation of both batches of "Good" and "Bad" requests and that aggregates them in two separate quantity hashes for at least memory conservation. The mediator activates the self-learning algorithm with the two hashes after an attack ends, thereby sending back the result "Selected-Feature-Mask" and "Signature" rule set to a transient multi-monitor (TMM) to be enforced, wherein the self-learning algorithm selects the "Selected-Feature-Mask" and "Signature" based on: (a) the good and bad samples, and (b) the features which are the most significant in the anomaly, wherein enforcement of an incoming request comprises determining whether the incoming request has applied with the "Selected-Feature-Mask" that is in the "Signature" set, and wherein the TMM enforces a most recently available "Selected-Feature-Mask" and "Signature" rule set.

Still referring to FIG. 4 and referring back to FIG. 3, in the method Ml, upon attack, for each interval (~10 sec), the collecting step comprises: collecting a "bad" dataset; and selecting metrics having a strong anomaly, e.g., having an expected number in a range of approximately 5 anomalies to approximately 15 anomalies from approximately 500 metrics, wherein the strong anomaly=(measured number of anomalies−threshold number of anomalies)/threshold number of anomalies, e.g., a strong anomaly should be >1.7. Noted is that (a) the "Threshold" or threshold number of anomalies equals a "baseline" threshold number of anomalies (without server health correction), (b) the "Measured" or measured number of anomalies differs from the number of "BAD actors global measured,". (c) "Measured for signatures" counts the number of full ingress requests statistics, including the mitigated traffic, and (d) "Measured for BAD actors detection" excludes the number of BAD actors (greylist) through the mitigated traffic.

Still referring to FIG. 4 and referring back to FIG. 3, the method M1 further comprises: ignoring all un-selected metrics, thereby grouping and counting the same requests (by selected metrics); iterating the selected groups starting from the most significant selected group, wherein the most significant selected group comprises a group having a number of hits being higher than other selected groups in the selected groups, and wherein the selected groups are aggregated by a hits-count; determining whether a rule matches too many requests in the "good" dataset by a given threshold, e.g., <approximately 1%; and, if the rule matches a number of requested in the "good" dataset above the given threshold, skipping the rule and adding the rule to an attack signature, whereby cumulative similar signatures are recognized, whereby a previous signature is used if a current signature is recognized as being cumulative, and wherein the number of attack signature identifications is minimized. The method M1, using the self-learning algorithm, blocks as many possible attackers without affecting more than 5 percent of the good clients.

Referring to FIG. 5 and referring back to FIG. 4, this flow diagram illustrates a method M2 of providing a device, e.g., a memory device 51, for automatically detecting attack signatures and generating attack signature identifications, in accordance with an embodiment of the present disclosure. The method M2 comprises: providing a non-transient memory device 51 storing a set of executable instructions configuring a processor 40, as indicated by block 600, for: collecting a "good" or stable dataset 54 during a stable time, e.g., via a statistics collector 55, wherein collecting the stable dataset 54 comprises requesting metadata collected during the stable time, wherein the stable time comprises a time period in which a site is not under attack, and wherein the time period excludes a predetermined time period before the cyber-attack, as indicated by block 601; determining whether a cyber-attack is detected, as indicated by block 602; when a cyber-attack is detected, e.g., via an anomaly detector 60 identifying a set of bad IPs 64, periodically generating a set of attack signatures (not shown), e.g., via a signatures generator 56, and updating an enforcer, e.g., an application security enforcer 57, with the set of attack signatures, wherein the set of attack signatures comprises at least one of a selected features mask and a number of requests for metadata bitmaps, and wherein the set of attack signatures represents a set of dynamic rules 61 to be enforced, as indicated by block 603; validating the set of dynamic rules 61 to be enforced via a long-time validation mechanism 58, wherein validating comprises considering behavior of each dynamic rule 61 in the set of dynamic rules 61 after the cyber-attack and during a new cyber-attack and ranking each dynamic rule 61 by using the stable dataset 54, thereby generating a set of persistent rules 59 comprising at least one dynamic rule 61 of the set of dynamic rules 61 having at least a predetermined rank, as indicated by block 604; exporting the set of persistent rules 59 to a security enforcer mechanism, e.g., the application security enforcer 57, wherein the security enforcement mechanism, e.g., the application security enforcer 57, comprises a cloud (not shown), as indicated by block 605; introducing the set of persistent rules 59 to a persistent rule revocation mechanism, e.g., a BADOS grey list mechanism 62, as indicated by block 606; determining whether export of at least one unrevoked persistent rule 59u is requested, as indicated by block 607; and, if requested, exporting the at least one unrevoked persistent rule 59u of the set of persistent rules 59 to a network intrusion detection system, e.g., the anomaly detector 60, through a mitigator 63 and collecting statistics thereof via the statistics collector 55, and wherein the at least one unrevoked persistent rule 59u is exported in a format compatible with at least one network intrusion detection system, e.g., the anomaly detector 60, and wherein the network intrusion detection system, e.g., the anomaly detector 60, comprises at least one of a Snort system, a predicates language, an extended Wireshark syntax, and any other extension syntax comprising an F5 filtering feature, as indicated by block 608.

Figure 6:
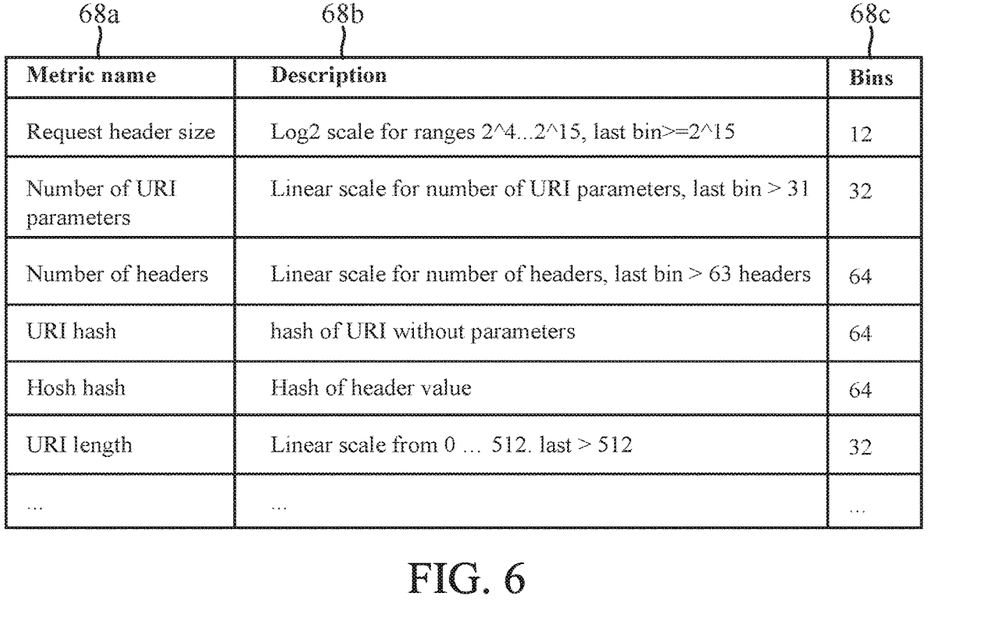
FIG. 6 is s table listing some metrics, their corresponding descriptions, and the corresponding number of bins, by example only, in accordance with sonic embodiments of the present disclosure.

Referring to FIG. 6, this table lists some metrics 68a, their corresponding descriptions 68b, and the corresponding number of bins 68c, in accordance with some embodiments of the present disclosure.

Figure 7:
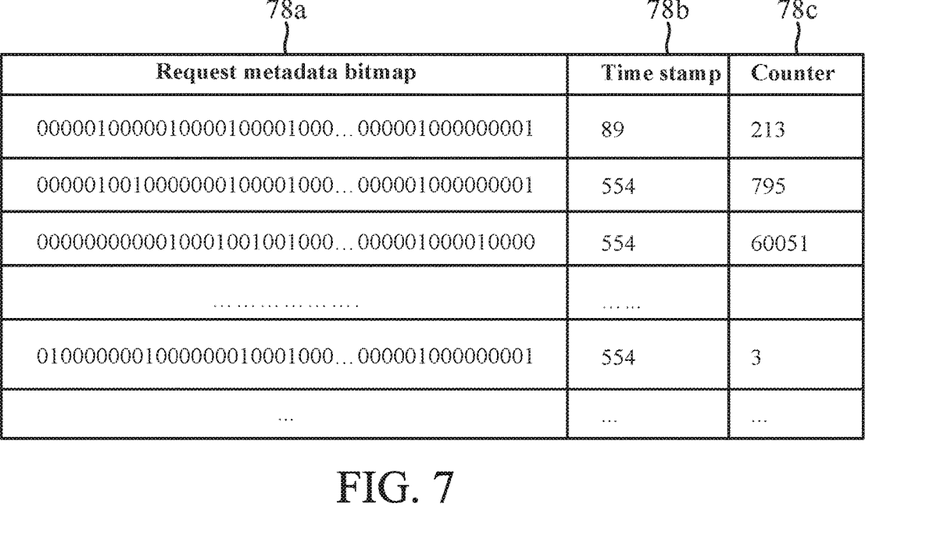
FIG. 7 is a table listing parameters of "request metadata bitmap" in binary code, corresponding timestamps, and corresponding counter values, for a dataset, by example only, in accordance with some embodiments of the present disclosure.

Referring to FIG. 7, this table lists parameters of "request metadata bitmap" 78a in binary code, corresponding timestamps 78b, and corresponding counter values 78c, for a dataset, by example only, in accordance with some embodiments of the present disclosure. The datasets are represented by a number, e.g., up to approximately 5000, entries of "request metadata," wherein "request metadata" is binary bitmap that describes a certain HTTP request where each bit corresponds to the presence of some predefined metric bin and originator IP.

Referring back to FIGS. 3 through 7, with the technology of the present disclosure, benefits include, but are not limited to, providing behavioral Anti-(D)DoS by applying automatic detection of (D)DoS attacks using behavioral data, characterizing the offending traffic and automatically mitigate on the offending traffic, providing a "hands off" method, wherein related art user intervention is eliminated, e.g., related art need to configure and maintain thresholds, and wherein an "engine" is self adjusting and adaptive to changes, alerting and mitigating attacks even before a defended service fails, and self-improving the engine with experience, wherein the engine operates with increasing confidence as a function of operational time.

Still referring back to FIGS. 3 through 7, ramifications of technology of the present disclosure include, but are not limited to, providing behavioral Anti (D)DoS that is complementary to current DDoS defense capabilities on AFM and ASM, mitigates DDoS attacks via BADoS by leveraging the rules and signatures as well as by capturing the attacks from whole new dimension—behavior analysis using machine learning, wherein a DDoS attack originates from a botnet, wherein each attacker uses standard browser, wherein each single request is completely legal and traffic generated by a single attacker is not significant, wherein a plurality of attackers will fail to kill the server.

Figure 8:
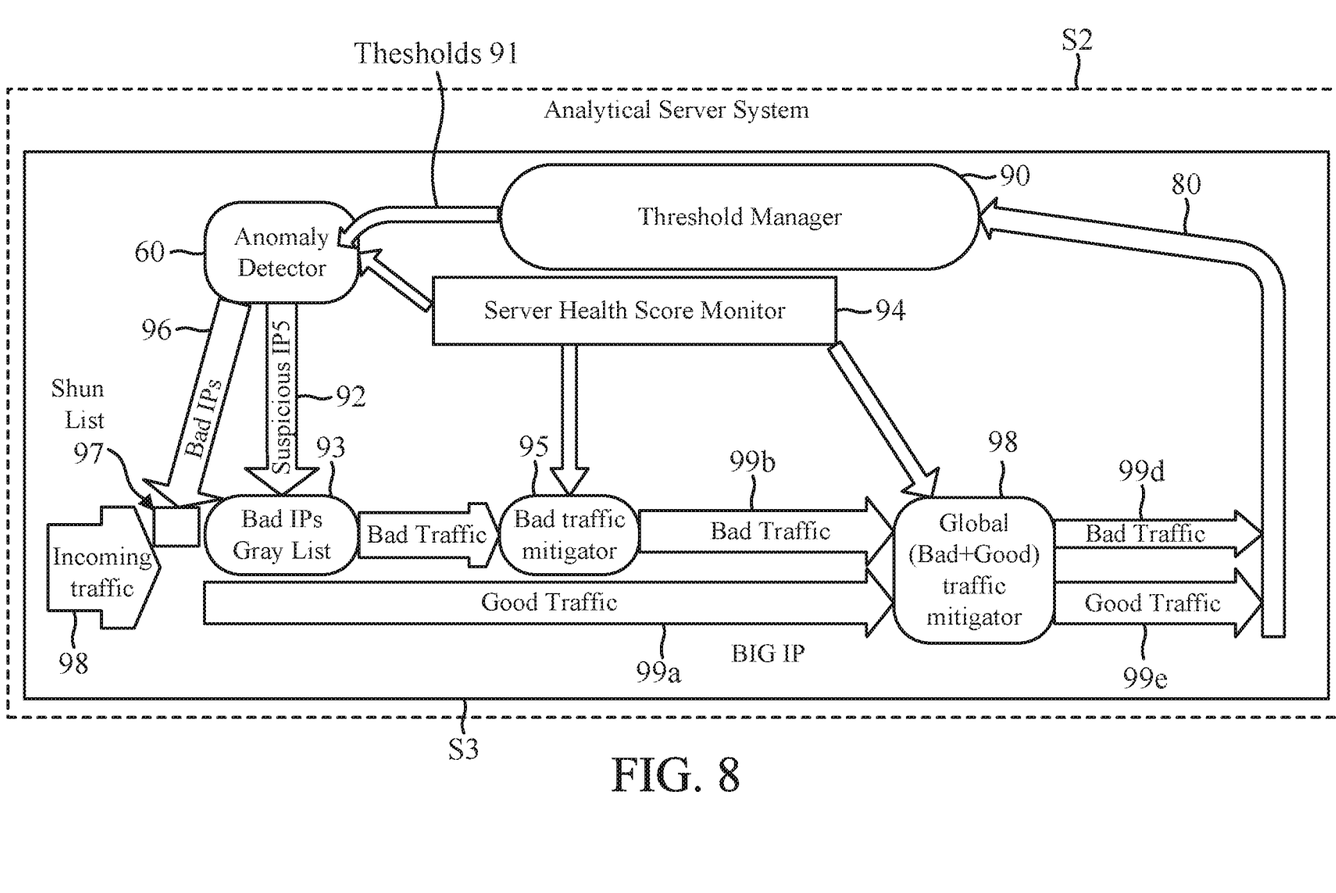
FIG. 8 is a schematic diagram illustrating a workflow of an analytical server system, operable with a BIG-IP system, in accordance with an embodiment of the present disclosure.

Referring to FIG. 8, this schematic diagram illustrates workflow of an analytical server system S2, operable with a BIG-IP system S3, in accordance with an embodiment of the present disclosure. The BIG-IP system S3 comprises a global traffic mitigator 98 which respectively collects behavior metrics and/or statistics from good traffic 99a and bad traffic 99b and respectively sends behavior metrics and/or statistics 99c, 99d of the good traffic 99a and the bad traffic 99b, via a data conduit 80, to a threshold manager 90. The threshold manager 90 builds statistical models and periodically sends the thresholds 91, corresponding to "normal" behavior, to an anomaly detector 60. The anomaly detector 60, analyzes the traffic by using the "normal" behavior thresholds 91 as a baseline and determines the traffic anomaly. Once an anomaly has been detected, the anomaly detector 60, starts examining the traffic of specific IPs to evaluate its contribution to the anomaly. IPs with a higher anomaly score (more involved in the anomaly), e.g., suspicious IPs 92, will be added to a Gray List 93 (the list of suspicious IPs 92). The anomaly detector 60, estimates the server load by monitoring of application behavior via a server health score monitor 94. In the case of DDoS attack, suspicious traffic will be mitigated via a mitigator 95. Bad IPs 96 are transmitted to s shun list 97. Incoming traffic 98, along with the good traffic 99a and the bad traffic 99b, are continuously transmitted to a global traffic mitigator 98 for continuously and respectively collecting behavior metrics and/or statistics from good traffic 99a and had traffic 99b and continuously and respectively sending behavior metrics and/or statistics 99c, 99d of the good traffic 99a and the bad traffic 99b, via the data conduit 80, to a threshold manager 90, so on and so forth.

Having thus described the basic concept of the present disclosure, the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the present disclosure. Additionally, the recited order of processing elements or sequences, or the use of numbers, letters, or other designations therefore, is not intended to limit the claimed processes to any order except as may be specified in the claims. Accordingly, the present disclosure is limited only by the following claims and equivalents thereto.

At least some aspects disclosed are embodied, at least in part, in software. That is, some disclosed techniques and methods are carried out in a computer system or other data processing system in response to its processor, such as a microprocessor, executing sequences of instructions contained in a memory, such as ROM, volatile RAM, non-volatile memory, cloud, cache, or a remote storage device.

A computer readable storage medium is used to store software and data which when executed by a data processing system causes the system to perform various methods or techniques of the present disclosure. The executable software and data is storable in various places, including for example ROM, volatile RAM, non-volatile memory, cloud, and/or cache. Portions of this software and/or data are stored in any one of these storage devices.

Examples of computer-readable storage media may include, but are not limited to, recordable and non-recordable type media such as volatile and non-volatile memory devices, read only memory (ROM), random access memory (RAM), flash memory devices, floppy and other removable disks, magnetic disk storage media, optical storage media, e.g., compact discs (CDs), digital versatile disks (DVDs), etc.), among others. The instructions can be embodied in digital and analog communication links for electrical, optical, acoustical or other forms of propagated signals, such as carrier waves, infrared signals, digital signals, and the like. The storage medium is the internet cloud, or a computer readable storage medium such as a disc.

Furthermore, at least some of the methods described herein are capable of being distributed in a computer program product comprising a computer readable medium that bears computer usable instructions for execution by one or more processors, to perform aspects of the methods described. The medium is provided in various forms such as, but not limited to, one or more diskettes, compact disks, tapes, chips, universal server bus (USB) keys, external hard drives, wire-line transmissions, satellite transmissions, internet transmissions or downloads, magnetic and electronic storage media, digital and analog signals, and the like. The computer usable instructions may also be in various forms, including compiled and non-compiled code.

At least some of the elements of the systems described herein are implemented by software, or a combination of software and hardware. Elements of the system that are implemented in software are written in a high-level programming language such as object-oriented programming or a scripting language. Accordingly, the program code is written in C, C++, J++, or any other suitable programming language and may comprise functions, modules or classes, as is known to those skilled in computer programming. At least some of the elements of the system that are implemented via software are written in assembly language, machine language or firmware as needed. In either case, the program code can be stored on storage media or on a computer readable medium that is readable by a general or special purpose programmable computing device having a processor, an operating system and the associated hardware and software that is necessary to implement the functionality of at least one of the embodiments described herein. The program code, when read by the computing device, configures the computing device to operate in a new, specific, and predefined manner for performing at least one of the methods described herein.

While the present disclosure describes various embodiments for illustrative purposes, such description is not intended to be limited to such embodiments. On the contrary, the applicant's teachings described and illustrated herein encompass various alternatives, modifications, and equivalents, without departing from the embodiments, the general scope of which is defined in the appended claims. Except to the extent necessary or inherent in the processes themselves, any particular order to steps or stages of methods or processes described in this disclosure is not intended or implied. In many cases the order of process steps is varied without changing the purpose, effect, or import of the methods described.

Information as herein shown and described in detail is fully capable of attaining the above-described embodiments of the present disclosure and the presently preferred embodiment, if any, of the present disclosure, and is, thus, representative of the subject matter which is broadly contemplated by the present disclosure. The scope of the present disclosure fully encompasses other embodiments and is to be limited, accordingly, by nothing other than the appended claims, wherein any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a device, an apparatus, a system, or a method to address each, and every, problem sought to be resolved by the present disclosure, for such to be encompassed by the present claims. Furthermore, no element, component, or method step in the present disclosure is intended to be dedicated to the public regardless of whether the element, component, or method step is explicitly recited in the claims. However, that various changes and modifications in form, material, work-piece, and fabrication material detail is made, without departing from the spirit and scope of the present disclosure, as set forth in the appended claims, as is apparent, or may become apparent, to those of ordinary skill in the art, are also encompassed by the present disclosure.

INDUSTRIAL APPLICABILITY

Generally, the present disclosure industrially applies to program application security technologies. More particularly, the present disclosure industrially applies to attack signature detection for program application security technologies. Even more particularly, the present disclosure industrially applies to attack signature detection and DoS for program application security technologies.

What is claimed:

1. A method of automatically detecting attack signatures and generating attack signature identifications by way of a processor operable via a set of executable instructions storable in relation to a non-transient memory device, the method comprising:
    collecting a stable dataset during a stable time;
    determining whether a cyber-attack is detected;
    when a cyber-attack is detected, periodically generating a set of attack signatures and updating an enforcer with the set of attack signatures, wherein the set of attack signatures represents a set of dynamic rules to be enforced;
    validating the set of dynamic rules to be enforced via a long-time validation mechanism, wherein validating comprises considering behavior of each dynamic rule in the set of dynamic rules after the cyber-attack and during a new cyber-attack and ranking each dynamic rule by using the stable dataset, thereby generating a set of persistent rules comprising at least one dynamic rule of the set of dynamic rules having at least a predetermined rank;
    exporting the set of persistent rules to a security enforcer mechanism;
    introducing the set of persistent rules to a persistent rule revocation mechanism;
    determining whether export of at least one unrevoked persistent rule is requested; and
    if requested, exporting the at least one unrevoked persistent rule of the set of persistent rules to a network intrusion detection system through a mitigator and collecting statistics thereof via the statistics collector.

2. The method of claim 1,
    wherein collecting the stable dataset comprises requesting metadata collected during the stable time,
    wherein the stable time comprises a time period in which a site is not under attack, and
    wherein the time period excludes a predetermined time period before the cyber-attack.

3. The method of claim 1, wherein the set of attack signatures comprises at least one of a selected features mask and a number of requests for metadata bitmaps.

4. The method of claim 1, wherein the security enforcement mechanism comprises a cloud.

5. The method of claim 1, wherein introducing the set of persistent rules to a persistent rule revocation mechanism comprises using a BADoS grey list mechanism.

6. A method of providing a device for automatically detecting attack signatures and generating attack signature identifications, the method comprising:
    providing a non-transient memory device storing a set of executable instructions for configuring a processor to:
    collect a stable dataset during a stable time;
    determine whether a cyber-attack is detected;
    when a cyber-attack is detected, periodically generate a set of attack signatures and updating an enforcer with the set of attack signatures, wherein the set of attack signatures represents a set of dynamic rules to be enforced;
    validate the set of dynamic rules to be enforced via a long-time validation mechanism, wherein validation comprises consideration of behavior of each dynamic rule in the set of dynamic rules after the cyber-attack and during a new cyber-attack and rank of each dynamic rule by using the stable dataset, whereby a set of persistent rules, comprising at least one dynamic rule of the set of dynamic rules having at least a predetermined rank, is generated;
    export the set of persistent rules to a security enforcer mechanism;
    introduce the set of persistent rules to a persistent rule revocation mechanism;
    determine whether export of at least one unrevoked persistent rule is requested; and
    if requested, export the at least one unrevoked persistent rule of the set of persistent rules to a network intrusion detection system through a mitigator and collect statistics thereof via the statistics collector.

7. The method of claim 6,
    wherein the stable dataset comprises a request for metadata collected during the stable time,
    wherein the stable time comprises a time period in which a site is not under attack, and
    wherein the time period excludes a predetermined time period before the cyber-attack.

8. The method of claim 6, wherein the set of attack signatures comprises at least one of a selected features mask and a number of requests for metadata bitmaps.

9. The method of claim 6, wherein the security enforcement mechanism comprises a cloud.

10. The method of claim 6, wherein the set of persistent rules are introducible to a persistent rule revocation mechanism via a BADoS grey list mechanism.

11. A non-transitory computer readable medium having stored thereon a set of instructions for automatically detecting attack signatures and generating attack signature identifications comprising executable code, which when executed by a processor, configures the processor to:
    collect a stable dataset during a stable time;
    determine whether a cyber-attack is detected;
    when a cyber-attack is detected, periodically generate a set of attack signatures and updating an enforcer with the set of attack signatures, wherein the set of attack signatures represents a set of dynamic rules to be enforced;

validate the set of dynamic rules to be enforced via a long-time validation mechanism, wherein validation comprises consideration of behavior of each dynamic rule in the set of dynamic rules after the cyber-attack and during a new cyber-attack and rank of each dynamic rule by using the stable dataset, whereby a set of persistent rules, comprising at least one dynamic rule of the set of dynamic rules having at least a predetermined rank, is generated;

export the set of persistent rules to a security enforcer mechanism;

introduce the set of persistent rules to a persistent rule revocation mechanism;

determine whether export of at least one unrevoked persistent rule is requested; and if requested, export the at least one unrevoked persistent rule of the set of persistent rules to a network intrusion detection system through a mitigator and collect statistics thereof via the statistics collector.

12. The non-transitory computer readable medium of claim 11,
wherein the stable dataset comprises a request for metadata collected during the stable time,
wherein the stable time comprises a time period in which a site is not under attack, and
wherein the time period excludes a predetermined time period before the cyber-attack.

13. The non-transitory computer readable medium of claim 11, wherein the set of attack signatures comprises at least one of a selected features mask and a number of requests for metadata bitmaps.

14. The non-transitory computer readable medium of claim 11, wherein the security enforcement mechanism comprises a cloud.

15. The non-transitory computer readable medium of claim 11, wherein the set of persistent rules are introducible to a persistent rule revocation mechanism via a BADoS grey list mechanism.

16. A network traffic management apparatus comprising memory having stored thereon a set of instructions for automatically detecting attack signatures and generating attack signature identifications comprising executable code, which when executed by a processor, configures the processor to:

collect a stable dataset during a stable time;

determine whether a cyber-attack is detected;

when a cyber-attack is detected, periodically generate a set of attack signatures and updating an enforcer with the set of attack signatures, wherein the set of attack signatures represents a set of dynamic rules to be enforced;

validate the set of dynamic rules to be enforced via a long-time validation mechanism, wherein validation comprises consideration of behavior of each dynamic rule in the set of dynamic rules after the cyber-attack and during a new cyber-attack and rank of each dynamic rule by using the stable dataset, whereby a set of persistent rules, comprising at least one dynamic rule of the set of dynamic rules having at least a predetermined rank, is generated;

export the set of persistent rules to a security enforcer mechanism;

introduce the set of persistent rules to a persistent rule revocation mechanism;

determine whether export of at least one unrevoked persistent rule is requested; and if requested, export the at least one unrevoked persistent rule of the set of persistent rules to a network intrusion detection system through a mitigator and collect statistics thereof via the statistics collector.

17. The network traffic management system of claim 16,
wherein the stable dataset comprises a request for metadata collected during the stable time,
wherein the stable time comprises a time period in which a site is not under attack, and
wherein the time period excludes a predetermined time period before the cyber-attack.

18. The network traffic management system of claim 16, wherein the set of attack signatures comprises at least one of a selected features mask and a number of requests for metadata bitmaps.

19. The network traffic management system of claim 16, wherein the security enforcement mechanism comprises a cloud.

20. The network traffic management system of claim 16, wherein the set of persistent rules are introducible to a persistent rule revocation mechanism via a BADoS grey list mechanism.

* * * * *